United States Patent [19]

Baron et al.

[11] 4,425,456

[45] Jan. 10, 1984

[54] COPOLYCARBONATES BASED ON BIS(4-HYDROXYPHENYL)BIPHENYL DISULFONE

[75] Inventors: Arthur L. Baron, New Martinsville, W. Va.; Sivaram Krishnan, Moers, Fed. Rep. of Germany; Mark W. Witman; Roger J. White, both of New Martinsville, W. Va.

[73] Assignee: Mobay Chemical Corporation, Pittsburgh, Pa.

[21] Appl. No.: 306,046

[22] Filed: Sep. 28, 1981

[51] Int. Cl.$^3$ ............................................ C08G 63/62
[52] U.S. Cl. ............................... 524/165; 524/609; 524/611; 528/171; 528/174; 528/196; 528/204
[58] Field of Search ............... 528/204, 196, 171, 174; 524/165, 609, 611

[56] References Cited

U.S. PATENT DOCUMENTS

| | | | |
|---|---|---|---|
| 2,964,794 | 12/1960 | Peilstocker et al. | 528/196 |
| 2,970,131 | 1/1961 | Moyer et al. | 528/196 |
| 3,028,365 | 4/1962 | Schnell et al. | 528/196 |
| 3,153,008 | 10/1964 | Fox | 528/196 |
| 3,269,986 | 8/1966 | Goldberg | 260/49 |
| 3,775,367 | 11/1973 | Nouvertne | 524/165 |
| 3,836,490 | 9/1974 | Bockmann et al. | 528/204 |
| 3,912,688 | 10/1975 | Schiller et al. | 528/171 |
| 4,303,776 | 12/1981 | Baron et al. | 528/171 |
| 4,306,055 | 12/1981 | Baron et al. | 528/171 |

Primary Examiner—Harold D. Anderson
Attorney, Agent, or Firm—Gene Harsh; Lawrence S. Pope; Aron Preis

[57] ABSTRACT

A copolycarbonate molding composition comprising the reaction product of an aromatic diphenol, a bis(4-hydroxyphenyl)biphenyl disulfone and a carbonate source is characterized by its high glass transition temperature. A blend thereof containing an organic acid salt is characterized by its improved flame retardance.

9 Claims, No Drawings

COPOLYCARBONATES BASED ON BIS(4-HYDROXYPHENYL)BIPHENYL DISULFONE

FIELD OF THE INVENTION

This invention relates to polycarbonates and more particularly to copolycarbonates having improved flame retardancy, improved high temperature resistance and good physical properties.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded articles where impact strength, rigidity, toughness, thermal and dimensional stability as well as excellent electrical properties are required.

Although polycarbonates have some inherent flame resistance being self-extinguishing (V-2 at ⅛" thickness according to UL Subject 94), ever more demanding applications have required improved flame retardance. Furthermore, it has been found that articles molded from conventional polycarbonates tend to exhibit both low heat deflection and Vicat softening temperature (ASTM D-648-72 and ASTM D-1525-76, respectively).

U.S. Pat. No. 3,269,986 relates to aromatic polycarbonates, the structure of which is characterized by alternating carbonate groups and sulfone-containing organic groups.

In accordance with the present invention, a copolycarbonate is provided having improved flame retardance, mechanical properties at elevated temperature and good physical properties.

SUMMARY OF THE INVENTION

A copolycarbonate of bis(4-hydroxyphenyl)biphenyl disulfone having improved flame retarding properties and improved mechanical properties at elevated temperature is prepared either by the interfacial polycondensation or transesterification processes.

DETAILED DESCRIPTION OF THE INVENTION

The copolycarbonates of the present invention may be prepared by conventional methods of preparation for polycarbonate resins and may have a weight average molecular weight of about 10,000 to 200,000, preferably of about 20,000 to 80,000, and particularly may have a melt flow rate of about 1 to 24 gm/10 min., most particularly about 2–6 gm/10 min., at 300° C. according to ASTM D-1238.

Any process, reactant, catalyst, solvent, reaction condition and the like for the production of the copolycarbonates generally may be used in the context of the present invention. Such are disclosed in German Patent Nos. 926,274 and 1,046,311 and U.S. Pat. Nos. 2,964,794; 2,970,131; 2,991,273; 2,999,835; 2,999,846; 3,028,365; 3,153,008; 3,187,065; 3,215,668; and 3,248,414, all incorporated herein by reference. The preferred processes are interfacial polycondensation and transesterification.

According to the interfacial polycondensation process, copolycarbonates are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide, or bis-chloroformic esters of the aromatic dihydroxy compounds. An organic solvent is provided in the reaction admixture which is a solvent for the polymer but not for the aromatic dihydroxy salts. Thus, chlorinated or non-chlorinated aliphatic or aromatic hydrocarbons are used as the organic solvent which dissolves the condensation product. Suitable solvents include cyclohexane, methylcyclohexane, benzene, toluene, xylene, methylene chloride, chloroform, carbon tetrachloride and chlorobenzene.

In order to limit the molecular weight, one may use monofunctional reactants such as monophenols, for example, the propyl-, isopropyl- and butyl-phenols, especially p-tert-butyl-phenol and phenol itself. In order to accelerate the reaction, catalysts such as tertiary amines, quaternary ammonium, phosphonium or arsonium salts and the like may be used. The reaction temperature should be about −20° C. to +150° C., preferably about 0° C. to 100° C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline, N,N-dimethyl-cyclohexylamine or preferably pyridine and the like.

In still another process, a diaryl carbonate can be transesterified with the aromatic dihydroxy compounds to form the polycarbonate resin.

It is to be understood that it is possible to combine in a chemically meaningful way in the processes described above both the aromatic dihydroxy compounds and the monohydroxy compounds in the form of alkali metal salts and/or bis-haloformic acid esters, and the amount of phosgene or carbonyl bromide then still required in order to obtain high molecular weight products. Other methods of synthesis in forming the polycarbonates of the invention such as disclosed in U.S. Pat. No. 3,912,688, incorporated herein by reference, may also be used.

The aromatic diphenols useful in the practice of the invention, all characterized in the absence of a sulfone bridging group therefrom include the following compounds: hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides and α,α-bis-(hydroxyphenyl)-diisopropylbenzenes, as well as their alkylated and halogenated derivatives. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) 1,570,703; 2,063,050; 2,063,052; 2,211,956 and 2,211,957, in French Patent Specification 1,561,518 and in the monograph "H. Schnell, Chemistry and Physics of Polycarbonates, Interscience Publishers, New York, 1964".

Preferred aromatic diphenols are those of the formula I

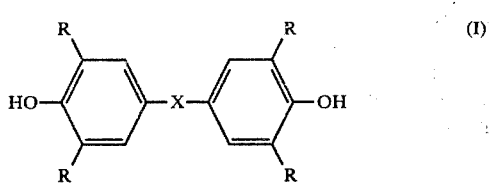

in which

R is identical or different and denotes H, $C_1$–$C_4$-alkyl, Cl or Br, preferably H or $C_1$–$C_4$-alkyl, and in which X is a bond, $C_1$–$C_8$-alkylidene, $C_2$–$C_8$-alkylidene, $C_5$–$C_{15}$-cycloalkylene, $C_5$–$C_{15}$-cycloalkylidene, —S—, —SO—, —CO—,

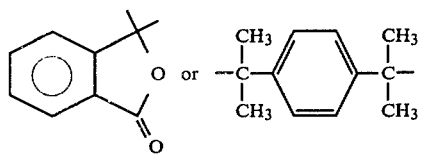

Examples of these aromatic diphenols are: 4,4′-dihydroxydiphenyl, 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfoxide, dihydroxy-benzophenone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl-benzene, 2,2-bis-(3,5-dichloro-4-hydroxyphenyl)-propane and 2,2-bis-(3,5-dibromo-4-hydroxyphenyl)-propane (tetrabromo bisphenol A).

Examples of particularly preferred aromatic diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

The most preferred aromatic diphenol is 2,2bis-(4-hydroxyphenyl)-propane (bisphenol A).

The bis(4-hydroxyphenyl)biphenyl disulfones useful in the practice of the present invention are those represented by the structural formula

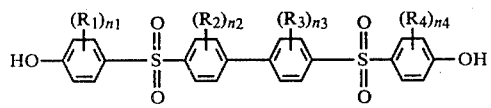

wherein $R_1$, $R_2$, $R_3$ and $R_4$ independently are H, $C_1$–$C_4$-alkyl, Cl or Br, preferably H, and $n_1$ to $n_4$ independently are 0 to 4. Structural units derived from these disulfones are present in the copolycarbonate in an effective amount, based on the total dihydroxy compound content, to improve the flammability properties and the mechanical properties at elevated temperatures of the polycarbonate. Preferably, these disulfones are present in about 0.1 to 60 wt. %, based on the total weight of dihydroxy compounds and, most preferably from about 0.5 to 20 wt. %.

The aromatic copolycarbonates can be branched by the incorporation therein of small amounts, preferably between about 0.05 and 2.0 mol % (relative to diphenols employed), of trifunctional or more than trifunctional compounds, especially compounds with three or more phenolic hydroxyl groups.

Polycarbonates of this type are described, for example, in German Offenlegungsschriften (German Published Specifications), 1,570,533; 1,595,762; 2,116,974 and 2,113,347, British patent specification Nos. 885,442 and 1,079,821 and U.S. Pat. Nos. 3,544,514 and 4,185,009, all incorporated herein by reference.

Some examples of compounds with three or more than three phenolic hydroxyl groups which can be used are phloroglucinol, 4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]propane, 2,4-bis-(4-hydroxyphenylisopropyl)-phenol, 2,6-bis-(2-hydroxy-5′-methyl-benzyl)-4-methylphenol, 2-(4-hydroxyphenyl)-2-(2,4-dihydroxyphenyl)-propane, hexa(4-(4-hydroxyphenylisopropyl)phenyl)orthoterephthalic acid ester, tetra-(4-hydroxyphenyl)-methane, tetra-(4-(4-hydroxyphenylisopropyl)-phenoxy)-methane and 1,4-bis-((4′,4″-dihydroxytriphenyl)-methyl)-benzene. Some of the other trifunctional compounds are 2,4-dihydroxybenzoic acid, trimesic acid, cyanuric chloride, 3,3-bis-(4-hydroxyphenyl)-2-oxo-2,3-dihydroindole and 3,3-bis-(4-hydroxyphenyl)-oxindole.

In a preferred embodiment of the present invention, the copolycarbonate may be intimately blended with small amounts of organic acid salts used alone or in combination with low concentrations of halogen-containing compounds to further improve the flame retardance of the copolycarbonate. Preferably, the acid salts are present in the copolycarbonate in quantities of from about 0.01 to 1% by weight, most preferably from about 0.05 to 0.2% by weight, based on the weight of the copolycarbonate. Additionally, halogen, preferably chlorine or bromine, may be introduced into the copolycarbonate either as a halogen-containing organic compound blended therewith or as a halogen-containing component of the polymeric structure, in which latter case the diols from which the copolycarbonate is produced are halogenated in a known manner. Preferably, the halogen content of the copolycarbonate of this embodiment is from about 0.01 to 7 wt. %, most preferably from about 1 to 3 wt. %, based on the weight of the copolycarbonate.

Suitable organic acid salts which may be used are disclosed in U.S. Pat. No.3,775,367, incorporated herein by reference, and include, for example, sodium and potassium perfluorobutane sulfonate, sodium and potassium perfluoromethylbutane sulfonate, sodium and potassium perfluorooctane sulfonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate, tetraethylammonium perfluorobutane sulfonate, tetraethylammonium perfluoromethylbutane sulfonate and the like and mixtures thereof. The corresponding chloro- and bromo-organic acid salts may also be used. Such sulfonates or mixtures thereof may be added to the polycarbonate during its preparation or they may be added to the melt of the finished polycarbonate by homogenization using an extruder, for example, or by any other suitable means which will ensure a thorough distribution in the copolycarbonate resin. Some such suitable methods are described, for example, in U.S. Pat. No. 3,509,091, incorporated herein by reference.

When the halogen atoms are to be present as substituents of the polycarbonate polymer itself, halogenated reactants are included in the reaction mixture from which the polycarbonate is being prepared. Thus, a halogenated dihydroxy compound may be included in the reaction mixture in addition to the conventional polycarbonate precursors and, upon the addition of a polycarbonate-forming derivative of carbonic acid under suitable reaction conditions, a copolycarbonate is formed wherein the divalent radicals derived from the halogenated dihydroxy compound and from the conventional polycarbonate precursor are linked together through divalent carbonate radicals.

Examples of halogen-containing dihydric phenol compounds which may be used as additives in order to improve the flame retardance of the copolycarbonates of this invention include 2,2-(3,5,3',5'-tetrachloro-4,4'-dihydroxydiphenyl) propane, 2,2-(3,5,3',5'-tetrabromo-4,4'-dihydroxydiphenyl) propane, (3,3'-dichloro-4,4'-dihydroxydiphenyl)methane, 1,1-bis-(4-hydroxy-2-chlorophenyl)ethane, 5'-chloro-2,4'-dihydroxydiphenyl sulfone, 5'-chloro-2',4-dihydroxydiphenyl sulfone, 3'-chloro-4,4'-dihydroxydiphenyl sulfone, 3'-chloro-2,4'-dihydroxydiphenyl sulfone, 4,4'-dihydroxy-3,3'-dichlorodiphenyl ether, 4,4'-dihydroxy-2,3'-dichlorodiphenyl ether, 4,4'-dihydroxy-3,3'-dichlorodinaphthyl ether, and the like.

Further, any other suitable halogenated polycarbonate may be employed such as, for example, those described in U.S. Pat. Nos. 3,043,800; 2,999,835; 3,028,365; 3,106,545; 3,106,546; 3,119,787; 3,141,863; 3,177,179; 3,186,961; 3,203,980; 3,220,978; 3,232,993; 3,240,756; 3,248,366; 3,251,805, all incorporated herein by reference.

In addition to forming copolycarbonates from the dihydroxy aromatic compounds and halogen-containing dihydroxy aromatic compounds, homopolymeric polycarbonates may also be formed from halogen-containing dihydroxy compounds such as the additives enumerated above.

Where desired, the halogenated organic compound may be introduced into the polycarbonate polymeric composition as a chain terminator, whether or not the remainder of the polymer contains halogen atoms. For example, halogenated phenols having from 1 to 5 halogen groups connected to the phenol nucleus may be incorporated into the polycarbonate resin, the amount employed being dependent on the desired molecular weight as well as the minimum required concentration of halogen atoms in accordance with this invention. Generally, the chain terminating agent may be introduced into the reaction mixture in any suitable manner as described in the processes set forth in the patents mentioned herein.

The copolycarbonates of the present invention may also contain other conventional resin additives such as glass fibers, pigments, dyes, UV stabilizers, thermal stabilizers, mold release agents and fillers. Examples of such suitable additives are discussed in the text *Chemistry and Physics of Polycarbonates* by Hermann Schnell, Interscience Publishers, New York, 1964 and in the text *Polycarbonates* by W. F. Christopher and D. W. Fox, Reinhold Publishing Corp. New York, 1962.

Any additives, including the organic acid salts and halogen-containing compounds, may be blended with the copolycarbonate in known mixing devices such as kneaders, single-screw extruders, twin-screw extruders, mills and the like.

The invention will be further illustrated, but is not intended to be limited, by the following examples.

EXAMPLES

EXAMPLE 1

Preparation of a copolycarbonate based on bis(4-hydroxyphenyl)biphenyl disulfone (HBD) by the transesterification polycondensation process.

A 500 ml 3-neck flask was charged with 80 g BPA (0.351 moles), 20 g HBD (0.0429 moles) and 92.7 g diphenyl carbonate (0.433 mole, 10% XS). The flask, equipped with an $N_2$ capillary bleed tube, a distillation head and a mechanical stirrer, was evacuated and flushed with nitrogen three times. The reaction mixture in the presence of a catalytic amount of anhydrous zinc acetate was heated to 220° C. at 300 mm Hg, and as phenol began to distill off, the temperature was gradually increased (300° C.) and pressure decreased (0.65 mm Hg) over three hours. After an additional two hours at 300° C. and 0.65 mm Hg, the molten polymer was scooped out of the flask to give 104 g of 20 wt. % HBD-BPA copolymer having a relative viscosity, measured in a 0.377 wt. % solution in $CH_2Cl_2$, 1.308 and a glass transition temperature of 167.8° C.

EXAMPLE 2

Preparation of a copolycarbonate based on bis(4-hydroxyphenyl)biphenyl disulfone (HBD) by the interfacial polycondensation process.

A copolycarbonate having a melt index of 3.4 g/10 min. was prepared by reacting a mixture of the disodium salts of 2,2-bis(4-hydroxyphenyl)-propane (bisphenol A) and bis(4-hydroxyphenyl)biphenyl disulfone with phosgene in accordance with the interfacial polycondensation synthesis hereinbefore discussed. 2.5 wt. % of bis(4-hydroxyphenyl)biphenyl disulfone and 97.5 wt. % of bisphenol A, based on the total weight of the dihydroxy compounds, was used, 2.4 mol percent, based on total bisphenol, of 4 t-butyl phenol was used as a chain stopper. The resulting, highly transparent copolycarbonate was then pelletized and ⅛" thick standard samples were molded for evaluation of physical properties. The properties measured are reported in Table 1.

EXAMPLES 3–15

Copolycarbonate based on bis(4-hydroxyphenyl)-biphenyl disulfone prepared in accordance with the procedure outlined in Example 2.

The properties of these resins are summarized in Table 1. Table 2 reports the properties of flame retardant compositions based on these resins wherein blended are organic acid salts or organic acid salts with halogen-containing compounds.

EXAMPLES 16–18

Industrial scale production runs of the copolycarbonates of the invention were carried out yielding resins having the properties summarized in Table 3. The preparation of a copolycarbonate resin containing 5% HBD (Example 18) was carried out as follows:

An aqueous solution of bisphenol A was prepared by simultaneously charging into a suitable mixing vessel Example 1 above. Table 4 reports some of the properties of these resins.

TABLE 1

| | Properties of BPA[1]/HBD[2] Copolycarbonates | | | | | | |
|---|---|---|---|---|---|---|---|
| Example No. | 2 | 3 | 4 | 5 | 6 | 7 | 8 (Control)[12] |
| HBD (wt %) | 2.5 | 2.5 | 2.5 | 5.0 | 5.0 | 5.0 | 0 |
| Melt Index (g/10 min)[3] | 3.4 | 4.1 | 11.4 | 5.1 | 4.8 | 2.9 | 3.1 |
| Sulfur (wt %) | 0.31 | 0.30 | 0.27 | 0.57 | 0.56 | 0.61 | — |
| UL-94[4] | | | | | | | |
| 3.2 mm (time,s) | V-0 (3.0) | V-1 (4.7) | V-2 (8.7) | V-2 (12.6) | V-0 (3.4) | V-1 (6.3) | V-2 |
| 1.6 mm (time,s) | V-2 | V-2 (3.9) | V-2 (7.1) | V-2 (3.8) | V-2 (3.8) | V-2 (16.6) | Fail V-2 |
| Oxygen Index (%)[5] | 28.5 | 26.5 | 27.0 | 25.0 | 26.3 | 25.0 | 24.2 |
| Notched Izod Impact[6] | | | | | | | |
| 3.2 mm (J/m) | 791 | 834 | 728 | 764 | 763 | 760 | 822 |
| 6.4 mm (J/m) | 152 | 160 | 128 | 137 | 145 | 154 | 164 |
| Critical Thickness (mm)[11] | 5.4 | 5.7 | 4.4 | 4.7 | 5.0 | 5.0 | 5.6 |
| Heat Distortion Temp. (°C.)[7] | | | | | | | |
| at 1.82 MPa | 140 | 138.1 | 137.9 | 137.3 | 139.4 | 141.2 | 134.0 |
| at 0.46 MPa | — | 138.4 | 140.6 | 137.0 | 136.3 | 140.3 | 135.8 |
| Vicat Softening Temperature (°C.)[8] | — | 159 | 157 | 158 | 159 | 162 | 155 |
| Ultimate Strength (MPa)[9] | 61.4 | — | 61.4 | 62.7 | 67.6 | 60.7 | 67.6 |
| Strength Failure (MPa)[9] | 53.1 | — | 56.5 | 62.1 | 67.6 | 60.7 | 69.6 |
| Elongation Yield (%)[9] | 8 | — | 8 | 8 | 6 | 8 | 8 |
| Elongation Failure (%)[10] | 15–95 | — | 95 | 105 | 125 | 75 | 105 |
| Flexural Strength (MPa)[10] | 79.3 | — | 91.0 | 92.0 | — | — | — |
| Ultimate Strength (MPa)[10] | 79.3 | — | 96.5 | 97.6 | — | — | — |
| Instron Melt Stability (300° C.) Kpas | | | | | | | |
| 5 min. | 700 | 682 | 260 | 420 | 530 | 810 | |
| 35 min. | 720 | 840 | 280 | 460 | 550 | 700 | |
| 65 min. | 720 | 874 | 300 | 430 | 580 | 760 | |

[1]BPA is bisphenol A
[2]HBD is bis(4-hydroxyphenyl)biphenyl disulfone
[3]ASTM D-1238; at 300° C. and 1200 g. load
[4]Underwriters Laboratories, Inc. 94: Standard for tests for flammability of plastic materials for parts in devices and appliances; the numbers in parentheses denote burning time in seconds.
[5]ASTM D-2863
[6]ASTM D-256
[7]ASTM D-648/72
[8]ASTM D-1525/76
[9]ASTM D-638
[10]ASTM D-790
[11]Mobay method: the thickness at which a transition from ductile to brittle performance upon impact occurs
[12]Merlon M-50 polycarbonate from Mobay Chemical Corporation 17.24 kg of bisphenol A, 0.91 kg HBD, 90.3 kg of water, 12.3 kg of 50% aqueous sodium hydroxide, and 0.20 kg of phenol. 33.9 kg/h of this solution was continuously phosgenated with 2.46 kg/h of phosgene in 43.1 kg/h of 1:1 methylene chloride:monochlorobenzene solvent. 2.3 kg/h of 25% aqueous caustic was added to maintain the proper pH for the interfacial reaction. The phosgenated solution was then mixed with 0.72 kg/h of 25% aqueous sodium hydroxide and 0.025 kg/h of triethylamine to catalyze the polycondensation reaction. The average time to complete the reaction was 45 minutes. The organic phase was separated from the aqueous phase and the organic phase containing the high molecular weight copolycarbonate was washed with aqueous sodium hydroxide solution, dilute phosphoric acid solution and water. The polymer solution was concentrated by evaporation of the solvent and the polymer recovered by passing the concentrated solution through a devolatilizing extruder. The polymer prepared in this fashion had a relative viscosity of 1.277 (0.37% in methylene chloride).

The temperature of the reaction was 25° C.–30° C. Examples 16 and 17 containing 0.5% and 1% HBD respectively were carried out in a similar fashion.

EXAMPLES 19–27

Copolycarbonates based on HBD were prepared by transesterification following the procedure outlined in

TABLE 2

| Example No. | 9 | 10 | 11 | 12 | 13 | 14 | 15 |
|---|---|---|---|---|---|---|---|
| Wt. % HBD[1] | 2.5 | 2.5 | 2.5 | 2.5 | 2.5 | 2.5 | 2.5 |
| Melt Index (gm/10 min)[2] | 3.4 | 4.1 | 4.1 | 4.1 | 11.4 | 11.4 | 3.4 |
| Added Organic[3] Acid Salt, wt. % | 0.1 | 0.05 | 0.075 | 0.1 | 0.075 | 0.1 | 0.1 |
| Added Halogen[4] | — | — | — | — | — | — | 1.00 |
| Flammability[5] Rating, UL-94 | | | | | | | |
| 1.6 mm (sec.) | V-0 (2.4) | V-2 (3.4) | V-0 (3.4) | V-0 (3.4) | V-2 | V-2 | V-0 (2.3) |
| 3.2 mm (sec.) | V-0 (2.1) | V-0 (1.2) | V-0 (1.1) | V-0 (0.9) | V-0 | V-0 | V-0 (0.8) |
| Oxygen Index[6] | 29.3 | 27.6 | 28.0 | 28.7 | 27.1 | 28.2 | 31.2 |
| Critical Thickness (mm) | — | — | — | — | — | — | 4.7 |

[1]HBD-bis(4-hydroxyphenyl)biphenyl disulfone
[2]Per ASTM D-1238 at 300° C.
[3]Potassium perfluorobutane sulfonate
[4]Bromine
[5]The number in parenthesis denotes burn time
[6]ASTM D-2863

TABLE 3

| Example No. | 16 | 17 | 18 |
|---|---|---|---|
| Wt. % HBD | 0.5 | 1 | 5 |
| Solution RV[1] | 1.335 | 1.324 | — |
| Pellet RV[1] | 1.320 | 1.326 | 1.271 |
| Melt Index | 3.8 | 3.8 | 7.6 |
| ⅛" Notched Izod (J/m) | 929.8 | 851.3 | 764.5 |

TABLE 3-continued

| Example No. | 16 | 17 | 18 |
|---|---|---|---|
| 1/4" Notched Izod (J/m) | 151.8 | 150.3 | 109.8 |
| Critical thickness (inch) | .218 | | .147 |
| Heat Distortion temperature 1.82 MPa, °C. | 142 | 139.6 | |
| Glass transition temperature °C. | 151.0 | | 150.4 |
| Sulfur content wt. %, actual | .04 | .12 | — |
| Sulfur content wt. %, theoretical | .06 | .12 | — |
| Flexural Properties | | | |
| Initial flex. (MPa) | 2256 | 2254 | 2280 |
| Flex strength (MPa) | 53.8 | 83 | 53.6 |
| Ult. Flex Strength (MPa) | 86.0 | 91 | 85.5 |
| Tensile Properties | | | |
| Yield (MPa) | 60.1 | 59.86 | — |
| Ult. (MPa) | 60.1 | 60.29 | — |
| Failure (MPa) | 52.6 | 57.04 | — |
| Ultimate elongation % | 87 | 88 | — |
| UL-94 flammability rating | | | |
| 1/16" (avg. burn time sec.) | Fails V-2 | Fail | V-2 (4.5) |
| 1/8" | 80% V-0 20% V-1 | V-1 (5.6) | V-0 (1.7) |
| Hydrolyzable Cl⁻ | 0 | — | 176 |
| Inorganic Cl (ppm) | 0 | 10 | 461 |

[1] Relative viscosity measured on a 0.377 wt % solution in $CH_2Cl_2$

TABLE 4
HBD-BPA COPOLYCARBONATES BY TRANSESTERIFICATION

| Example No. | Wt. % HBD | RV[1] | Tg[2] | $M_w$[3] | $M_n$[4] |
|---|---|---|---|---|---|
| Control[5] | 0 | 1.289 | 146.4 | 36,600 | 13,800 |
| 19 | .5 | 1.292 | 146.5 | 32,300 | 13,300 |
| 20 | 15 | 1.256 | 160.3 | 28,000 | 12,600 |
| 21 | 15 | 1.264 | 160.3 | 32,600 | 14,200 |
| 22 | 20 | 1.308 | 167.8 | 39,600 | 16,600 |
| 23 | 25 | 1.247 | 169.4 | 29,600 | 13,000 |
| 24 | 30 | 1.476 | 182.3 | 65,200 | 23,800 |
| 25 | 30 | 1.324 | 181.0 | | |
| 26 | 40 | 1.264 | 187.0 | | |
| 27 | 50 | 1.231 | 201.5 | | |

[1] Relative viscosity measured on a 0.377 wt % solution in $CH_2Cl_2$
[2] Glass transition temperature determined at 20° C./min. under 20 cc/min. $N_2$ purge
[3] Weight average molecular weight, relative values based on calibration for BPA polycarbonates
[4] Number average molecular weight, relative values based on calibration for BPA polycarbonates
[5] Merlon 40, polycarbonate resin by Mobay Chemical Corporation prepared by transesterification

EXAMPLE 28

A copolymer of bisphenol A and HBD containing 0.1% HBD was prepared and tested. The properties of this copolycarbonate are listed below:

| | |
|---|---|
| Glass transition temperature, °C. | 147.8 |
| Flammability rating UL-94 | |
| 1/8 (burn time, sec) | V-2 (13.9) |
| 1/16 (burn time, sec) | V-2 (14.9) |
| HDT, °C. @ 1.82 MPa | 140 |
| Impact strength, Izod-notched, ft. lbs/in. | |
| 1/8" | 17.38 |
| 1/4" | 2.73 |
| Critical thickness, mils | 206 |
| Tensile yield strength, MPa | 59.1 |
| Tensile failure strength, MPa | 66.4 |
| Ultimate elongation, % | 110–120 |
| Flexural strength, MPa | 54.1 |
| Flexural modulus, GPa | 2.28 |
| Haze, % | 1.8 |

Although the invention has been described in detail in the foregoing for the purpose of illustration, it is to be understood that such detail is solely for that purpose and that variations can be made therein by those skilled in the art without departing from the spirit and scope of the invention as it may be limited by the claims.

What is claimed is:

1. An aromatic copolycarbonate molding composition comprising structural units derived from
   (i) bis(4-hydroxyphenyl)biphenyl disulfone and
   (ii) at least one other aromatic diphenol selected from the group consisting of 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane, and
   (iii) a member selected from the group consisting of carbonyl bromide, phosgene, bischloroformic esters of (i) or (ii) and diaryl carbonate.

2. The aromatic copolycarbonate of claim 1 wherein said bis(4-hydroxyphenyl)biphenyl disulfone is of the structural formula:

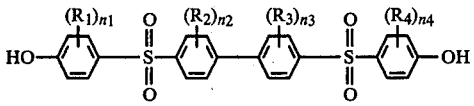

wherein
$R_1$, $R_2$, $R_3$ and $R_4$ independently are H, $C_1$–$C_4$-alkyl, Cl or Br, and
$n_1$ to $n_4$ independently denote 0 to 4.

3. The aromatic copolycarbonate of claim 2 wherein said bis(4-hydroxyphenyl) biphenyl disulfone is of the structural formula

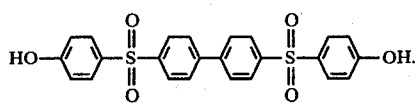

4. The aromatic copolycarbonate of claim 1 wherein said bis(4-hydroxyphenyl)biphenyl disulfone is present at a level of about 0.1 to 60 wt. %, based on the total weight of dihydroxy compounds.

5. The aromatic copolycarbonate of claim 4 wherein sad bis(4-hydroxyphenyl)biphenyl disulfone is present at a level of about 0.5 to 20 wt. %, based on the total weight of dihydroxy compounds.

6. A thermoplastic aromatic polycarbonate molding composition comprising a blend of
   (i) the product of a reaction comprising
      (a) at least one aromatic diphenol selected from the group consisting of 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane,
      (b) bis(4-hydroxyphenyl)biphenyl disulfone and
      (c) a member selected from the group consisting of carbonyl bromide, phosgene, bischloroformic esters of (a) or (b) and diaryl carbonates and
   (ii) about 0.1 to 1 percent of an organic acid salt, said percent being relative to the weight of said product of a reaction.

7. The aromatic polycarbonate molding composition of claim 6 wherein the organic acid salt is selected from the group consisting of sodium perfluorobutane sulfonate and potassium perfluorobutane sulfonate.

8. The aromatic polycarbonate molding composition of claim 6 intimately blended with a sufficient amount of a halogen-containing compound to produce a composition containing about 0.01 to 7 wt. % of halogen, based on the weight of the aromatic polycarbonate.

9. The aromatic polycarbonate molding composition of claim 8 wherein said halogen is bromine.

* * * * *